(12) United States Patent
Sato et al.

(10) Patent No.: US 8,916,619 B2
(45) Date of Patent: Dec. 23, 2014

(54) METHOD OF PRODUCING POROUS POLYMER FILM AND POROUS POLYMER FILM PRODUCED BY THE METHOD

(75) Inventors: Naotake Sato, Sagamihara (JP); Toshihiro Kikuchi, Yokohama (JP); Yuichi Hashimoto, Tokyo (JP); Yohei Miyauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 13/320,976

(22) PCT Filed: Jun. 16, 2010

(86) PCT No.: PCT/JP2010/060598
§ 371 (c)(1),
(2), (4) Date: Nov. 17, 2011

(87) PCT Pub. No.: WO2010/150794
PCT Pub. Date: Dec. 29, 2010

(65) Prior Publication Data
US 2012/0065284 A1 Mar. 15, 2012

(30) Foreign Application Priority Data
Jun. 23, 2009 (JP) ................................. 2009-149220

(51) Int. Cl.
*C08J 9/28* (2006.01)
*H01M 8/10* (2006.01)
*C08J 5/18* (2006.01)
*B01D 67/00* (2006.01)

(52) U.S. Cl.
CPC ......... *B01D 67/0016* (2013.01); *H01M 8/1053* (2013.01); *H01M 2300/0082* (2013.01); *B01D 2325/30* (2013.01); *C08J 5/18* (2013.01); *H01M 8/1081* (2013.01); *B01D 2325/24* (2013.01); *B01D 2325/02* (2013.01); *Y02E 60/521* (2013.01)
USPC .................. 521/61; 521/62; 521/64; 521/183

(58) Field of Classification Search
USPC ........................................ 521/61, 62, 64, 183
See application file for complete search history.

(56) References Cited

U.S. PATENT DOCUMENTS

| | | | |
|---|---|---|---|
| 4,957,817 A | 9/1990 | Chau et al. | |
| 6,565,962 B2 | 5/2003 | Ohya et al. | |
| 6,632,849 B1 * | 10/2003 | Yao et al. ........................ | 521/64 |
| 7,303,811 B2 | 12/2007 | Yao et al. | |
| 7,311,966 B2 | 12/2007 | Yao et al. | |
| 7,820,281 B2 | 10/2010 | Tsuyumoto et al. | |
| 2003/0129379 A1 | 7/2003 | Yao et al. | |
| 2004/0241419 A1 | 12/2004 | Yao et al. | |
| 2005/0118479 A1 | 6/2005 | Yamaguchi et al. | |
| 2006/0121267 A1* | 6/2006 | Tsuyumoto et al. ....... | 428/315.7 |
| 2007/0275222 A1 | 11/2007 | Yao et al. | |
| 2010/0303520 A1 | 12/2010 | Miyauchi et al. | |

FOREIGN PATENT DOCUMENTS

| | | |
|---|---|---|
| CN | 1694791 A | 11/2005 |
| JP | 2000-319442 A | 11/2000 |
| JP | 2003-138057 A | 5/2003 |
| JP | 2004-175104 A | 6/2004 |
| JP | 2004-244462 A | 9/2004 |
| JP | 2004-359860 A | 12/2004 |
| JP | 2005-213315 A | 8/2005 |
| JP | 2007-92078 A | 4/2007 |
| JP | 2007-169661 A | 7/2007 |
| JP | 4110669 B | 7/2008 |
| WO | 2006-090579 A1 | 8/2006 |

OTHER PUBLICATIONS

Office Action in Chinese Application No. 201080027357.9 (dated May 9, 2013).
Extended European Search Report in European Application No. 10792112.4 (dated Oct. 2013).

* cited by examiner

*Primary Examiner* — Irina S Zemel
(74) *Attorney, Agent, or Firm* — Fitzpatrick, Cella, Harper & Scinto

(57) ABSTRACT

A porosity is freely controlled in preparation of a porous polymer film by a phase separation method. A solvent absorption sheet is used for a solvent in a polymer solution so that the coating film of the polymer solution may be covered with the sheet. After that, the solvent in the film is selectively removed. Then, the resultant is immersed in a poor solvent. Thus, a porous polymer film can be produced.

5 Claims, 1 Drawing Sheet

METHOD OF PRODUCING POROUS POLYMER FILM AND POROUS POLYMER FILM PRODUCED BY THE METHOD

TECHNICAL FIELD

The present invention relates to a method of producing a porous polymer film and a porous polymer film produced by the method.

BACKGROUND ART

Aromatic polymers have been conventionally used in various fields because of their high thermal stability and high dynamical stability as compared with those of aliphatic polymers. Of those, polyimide, polyamideimide, polyamide, polyetherimide, polysulfone, polyethersulfone, and the like each having an aromatic functional group are each particularly excellent in, for example, chemical resistance and mechanical properties. Accordingly, investigations have been conducted on the application of porous polymer films formed by turning those aromatic polymers into porous thin films to gas separation films and electrolyte membranes for fuel cells.

A method described in Japanese Patent Application Laid-Open No. 2007-169661 (in the case of polyimide) is available as a method of producing any such porous polymer film. To be specific, the method is a method involving: forming a coating film from a polyamic acid solution obtained by a polycondensation reaction between a tetracarboxylic dianhydride and an aromatic diamine; and immersing the film in a poor solvent for a polymer solution to perform solvent substitution so that the phase separation precipitation (formation of a porous body) of polyamic acid may be induced (hereinafter referred to as "phase separation method"). A polyimide porous polymer film can be produced by the imide conversion of the porous polymer film obtained by the method through a heat treatment.

In methods of producing the porous polymer films based on the phase separation method, the films are formed of, for example, polyimide and polyamideimide each having an aromatic functional group, and polymer solutions each having a high viscosity are used as raw materials. As a result, it has been difficult to control a porosity. This is because the porosity of a porous polymer film to be obtained strongly depends on the volume fraction of a solvent in a polymer solution serving as a raw material.

In addition, the shapes of voids formed by the phase separation method are determined by the substitution and diffusion of the poor solvent in the coating film, and hence a void diameter distribution often varies to a large extent. In view of the foregoing, a technology involving covering the coating film before a phase separation operation with a solvent substitution rate adjustor to reduce the variation has been disclosed (for example, Japanese Patent No. 4,110,669 and Japanese Patent Application Laid-Open No. 2003-138057).

DISCLOSURE OF THE INVENTION

No conventional technologies enable free control of a porosity dependent on the volume fraction of the solvent of a polymer solution in a wide range.

The inventors of the present invention have made extensive studies to achieve the above-mentioned object, and consequently, have reached the present invention. That is, the present invention provides a method of producing a porous polymer film, the method including: forming a film of a solution containing a polymer constituting a porous polymer film; bringing a sheet that selectively absorbs a solvent in the solution rather than a solute in the solution into contact with the film; and making the film porous after the contact with the sheet.

In the present invention, a solvent in the film of a polymer solution is easily and selectively removed with a sheet that selectively absorbs the solvent rather than a solute in the polymer solution (hereinafter referred to as "solvent absorption sheet"). As a result, the amount of the solvent in the film before being made porous can be adjusted, and the volume fraction of the solvent component can be controlled. Accordingly, a porous polymer film formed of at least independent voids and having a low porosity that has been conventionally difficult to achieve can be simply and suitably produced.

Further, the porosity of a porous polymer film using an engineering plastic as a raw material is controlled, and hence a functional porous polymer film excellent in mechanical properties can be produced.

Further features of the present invention will become apparent from the following description of exemplary embodiments with reference to the attached drawings.

BEST MODE FOR CARRYING OUT THE INVENTION

Figure 1:
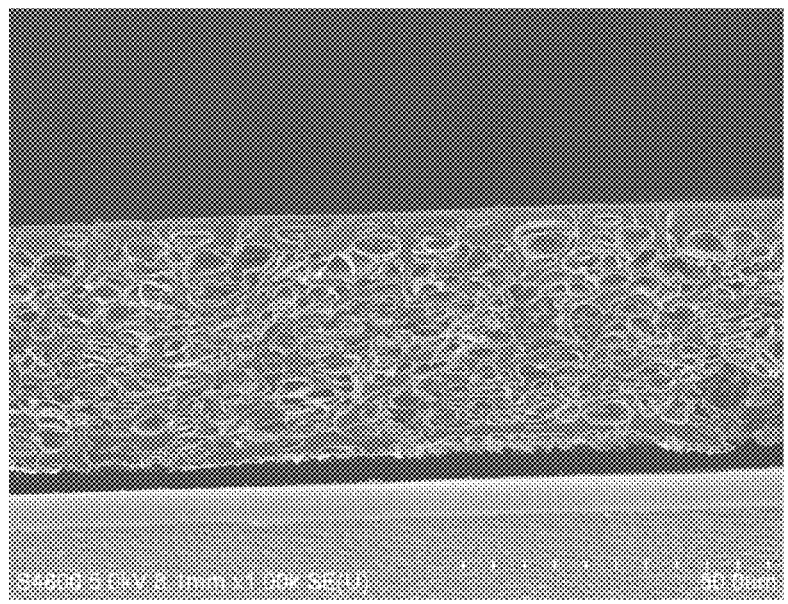
FIG. 1 is a scanning electron microscope photograph of the section of a porous polyimide film prepared in Example 1.

Embodiments of the present invention are described below, but the present invention is not limited to them.

The method of producing a porous polymer film according to the present invention involves: forming a film of a solution containing a polymer constituting a porous polymer film; bringing a sheet that selectively absorbs a solvent in the solution rather than a solute in the solution into contact with the film; and making the film porous after the contact with the sheet.

In the present invention, the following has been found. That is, after the film of the polymer solution has been covered with the solvent absorption sheet, the film is brought into contact with a poor solvent, and as a result, a porous polymer film formed of at least independent voids can be produced. The voids constituting the porous body are formed by immersing the polymer solution in the poor solvent to perform solvent substitution. The shapes of the voids to be formed are known to vary in correlation with a solvent substitution rate, a void formation rate, and the viscosity of the polymer solution. In addition, when the film is covered with the sheet, the removal of the solvent component of the film progresses uniformly and slowly. Accordingly, the precipitation of an aggregate particularly on the surface of the film is inhibited. Although a detailed mechanism for the void formation in the present invention has been currently unclear, the mechanism is probably as described below. That is, when the film is covered with the solvent absorption sheet of the present invention, a balance among the three elements that affect the void formation is suitably controlled, and hence the independent voids are particularly dominantly formed.

The polymer of the porous polymer firm is preferably formed of a material referred to as engineering plastic, specifically, of at least one kind of polyimide, polyamideimide, polyamide, polyetherimide, polysulfone, and polyethersulfone.

Further, the polymer of the porous polymer firm is more preferably formed of one or more kinds of polyimide, polyamideimide, polyamide, polyetheramide, polysulfone, and polyethersulfone each having an aromatic functional group.

Each solvent of the polymer solution serving as a raw material is an organic polar solvent, and one characteristic requested of the solvent is as described below. That is, the solvent has high polarity and is inert to a system. Preferred examples of the solvent include such solvent that is formed of one or more kinds of N,N-dimethylformamide, N,N-dimethylacetamide, N,N-diethylformamide, N,N-diethylacetamide, N,N-dimethylmethoxyacetamide, 1-methyl-2-pyrrolidone (hereinafter referred to as "NMP"), dimethyl sulfoxide, pyridine, tetramethylene sulfone, dimethyltetramethylene sulfone, diglyme, nitrobenzene, and carbon disulfide. In addition, it is particularly preferred that a total volume fraction of the solvent be at least 50% with respect to an entirety of the polymer solution.

The term "volume fraction of the solvent" as used herein refers to the volume fraction of the solvent in the polymer solution. The expression "the total volume fraction of the solvent is at least 50% with respect to the entirety of the polymer solution" can be translated into "the total of the solvent accounts for at least 50 vol % of the entirety of the polymer solution."

When the volume fraction of a component except the solvent is set to 50% or more with respect to the entirety of the polymer solution, in general, the polymer is precipitated, and hence a smooth, homogeneous coating film cannot be prepared, though whether the preparation can be performed depends on the kind and concentration of the polymer. Accordingly, the volume fraction of the component except the solvent is preferably suppressed to less than 50% with respect to the entirety of the polymer solution.

Representative examples of a solvent to be used in combination with the organic polar solvent include phenols such as cresol, phenol, and xylenol, benzonitrile, dioxane, butyrolactone, xylene, cyclohexane, hexane, benzene, and tolulene. However, the solvents are not necessarily limited thereto, and two or more kinds thereof may be used in combination in a mixture.

The concentration of the polymer solution (resin) strongly depends on the kind and average molecular weight of the aromatic polymer. Accordingly, it is difficult to define a preferred concentration range uniquely. However, the concentration is preferably 1 to 40 wt % or particularly preferably 10 to 20 wt % with respect to the organic solvent. When the polymer concentration is less than 1 wt %, it becomes difficult to retain the structure of the porous polymer film. When the concentration exceeds 40 wt %, it becomes difficult to prepare a uniform coating film. Accordingly, the above-mentioned concentration range is preferred. In addition, the polymer solution has a viscosity of preferably 100 to 100,000 cP or more preferably 500 to 50,000 cP. When the viscosity of the solution is less than 100 cP, the porous polymer film has an insufficient dynamical strength, and hence it becomes difficult to retain the structure. When the viscosity exceeds 100,000 cP, it becomes difficult to prepare a coating film having high smoothness. Accordingly, the above-mentioned viscosity of the solution is preferred.

Next, the formation of the film of the polymer solution and a method of removing the solvent from the film in the present invention are described in detail.

First, the step of forming the film of the solution containing the polymer constituting the porous polymer film is described. In the present invention, a general application method such as a coating method involving the employment of a spray method or a doctor blade method, or a method involving extrusion from a T-die can be employed as a method of forming the film of the polymer solution on a supporting substrate. A preferred example of the method is a method involving application onto a substrate such as a polyimide sheet or a glass or onto a substrate as a movable belt. The polymer solution may contain an additive such as a surfactant, a flame retardant, or a colorant, or a reinforcement such as a glass fiber, a silicon-based fiber, or an inorganic powder. Those additives and reinforcements may each be added in advance to a good solvent solution for the above-mentioned polymer solution.

Next, the step of bringing the sheet that selectively absorbs the solvent in the solution rather than the solute in the solution into contact with the film is described. In the present invention, the film is covered with the solvent absorption sheet so that the solvent component may be selectively removed. The solvent absorption sheet can remove only the solvent component by swelling with the solvent in the coating film. Therefore, the thickness of the solvent absorption sheet, the time period for which the sheet is swelled, the temperature at which the coating film is covered with the sheet, and the like are adjusted depending on the thickness of the coating film and the concentration of the solution. As a result, the amount of the solvent to be removed can be controlled. In addition, it is sufficient that the solvent absorption sheet contact the film, and the solvent component can be selectively removed irrespective of the direction of gravity. In the present invention, the film is preferably covered with the solvent absorption sheet.

Therefore, a required amount of the solvent is removed, and then, as the step of making the coating film porous, the coating film is immersed in the poor solvent for the polymer solution so that phase separation may occur. As a result, a porous polymer film formed of independent voids and having a controlled porosity can be produced. In particular, the film can be formed of such independent voids that an area ratio of the independent voids to all voids per unit area at the time of the observation of its section is 80% or more. The term "independent voids" as used in the present invention refers to such a structure as described below. That is, in the porous polymer film, each space portion is independent of another, and the respective space portions are partitioned with a wall of the resin. In addition, the wall of the resin is not perforated with holes penetrating the wall.

In addition, the absorption of the solvent in the coating film can be controlled not only by adjusting the thickness of the solvent absorption sheet but also by adjusting the size of the covered area on the coating film. In the present invention, at least the entirety of one surface of the coating film is preferably covered with the solvent absorption sheet.

This is because, when only part of one surface on the coating film is covered with the solvent absorption sheet, the porous film is such that the void distribution, void diameters, and void shapes of the entirety of the coating film are non-uniform and heterogeneous. It should be noted that, when one aims to intentionally provide the void distribution, the void diameters, the void shapes, and the like with gradients, part of one surface on the coating film can be covered.

The solvent absorption sheet is requested to have such property as to swell with the solvent in the polymer solution. A difference in solubility parameter (SP value, unit: $(J/m^3)^{1/2}$) between the solvent absorption sheet and the solvent as one guide for the retention of the property preferably falls within the range of about ±4. However, the difference between the SP value of the solvent and the SP value of the solvent absorption sheet is not an absolute measure concerning a correlation with the swelling of the sheet, and hence the difference cannot be an absolute criterion upon selection of the solvent absorption sheet. The difference is only a guide at the time of the preparation of the porous polymer film. In addition, the solvent absorption sheet must have a dynamical strength enough to maintain the structure of the solvent absorption sheet against a peeling operation after the phase separation operation. The term "dynamical strength enough to maintain the structure of the solvent absorption sheet" as used herein refers to such a strength that, upon peeling of the solvent absorption sheet adhering to the coating film from the coating film, the sheet is neither broken nor partially left on the coating film.

When the coating film of the polymer solution is covered with the solvent absorption sheet that satisfies the above-mentioned property, the solvent component can be selectively absorbed and removed from the inside of the coating film.

The solvent of the polymer solution is preferably N,N-dimethylformamide (SP value: 24.8), N,N-dimethylacetamide (SP value: 22.1), N,N-diethylformamide (SP value: 25.0), N,N-diethylacetamide (SP value: 23.5), N,N-dimethylmethoxyacetamide(SP value: 27.1), 1-methyl-2-pyrrolidone (SP value: 23.1), dimethyl sulfoxide (SP value: 26.1), pyridine (SP value: 21.9), tetramethylene sulfone (SP value: 27.3), dimethyltetramethylene sulfone (SP value: 24.7), diglyme (SP value: 20.1), nitrobenzene (SP value: 20.4), and carbon disulfide (SP value: 20.4). The solution is particularly preferably formed so that a total volume of at least one solvent is 50% or more. A specific solvent absorption sheet is preferably formed of one or more kinds of cellulose-, nylon-, and polyester-based materials.

In the case of the cellulose-based material, a sheet with its solubility in an organic solvent improved by chemical denaturation such as nitration or acetylation is preferred (cellulose nitrate, SP value: 22.1; cellulose acetate, SP value: 22.8). A cellulose that is not chemically denatured (SP value: 31.4) is not proper because a surface having high smoothness is hardly obtained and swelling with a solvent significantly reduces a dynamical strength.

The nylon-based material (such as nylon 66, SP value: 27.8) and the polyester-based material (such as PET, SP value: 21.8, or polylactic acid, SP value: 19.6) are preferred because smooth sheets each having high solubility in an organic solvent are easily obtained as in the case of the chemically denatured cellulose-based material.

The solvent absorption sheet preferably has a thickness of 0.01 to 500 µm. In order that the efficiency with which the solvent absorption sheet removes the solvent may be improved, the sheet is preferably a porous body so that its surface area may increase. However, the sheet is not necessarily requested to be a porous body. It is sufficient that the time period for which the coating film of the polymer solution is covered with the solvent absorption sheet be such that the solvent absorption sheet can sufficiently remove the solvent. To be specific, a time period of about 1 to 60 minutes suffices.

In addition, the concentration of the polymer solution constituting the coating film, the thickness of the coating film, the thickness of the sheet with which the coating film is covered, the time period for which the film is covered with the sheet, and the like can be controlled, and hence the thickness and porosity of the porous polymer film can be widely controlled. For example, when the thickness of the sheet for covering is increased, the amount of the solvent that can be absorbed and removed increases, and hence the porosity can be additionally reduced. In addition, the porosity increases in inverse proportion to the time period for which the film is covered with the sheet.

For example, the porosity of the porous polymer film formed of independent voids obtained by the production method of the present invention (a method of calculating the porosity is described later) can be controlled from 5% to the volume fraction of the solvent in the polymer solution as a raw material. In particular, the porosity can be controlled to fall within the range of 10% to 60%. With regard to a porosity that can be specifically controlled, as described in examples below, the porous polymer film obtained by the production method of the present invention is characterized in that its porosity ranges from 10% to 60%.

Then, the step of making the film porous after the contact with the sheet is described in detail. The step of making the film porous in the present invention is a step involving: immersing the coating film in a poor solvent together with the solvent absorption sheet with which the coating film is coated; peeling the solvent absorption sheet from the coating film after the immersion; and heating the coating film (including the substrate).

The coating film described above is preferably made porous by being immersed in the poor solvent for about 10 to 720 minutes in a state where the film is covered with the solvent absorption sheet.

When the immersion time is less than 10 minutes, the extent to which the film is made porous by solvent substitution may be insufficient, and hence there is a high possibility that a homogenous porous polymer film cannot be obtained. In addition, even when the film is immersed for more than 720 minutes, the extent to which the film is made porous hardly changes, and hence the immersion for more than 720 minutes is not needed.

It is preferred that the poor solvent be a poor solvent for the polymer solution and be compatible with a good solvent for the polymer solution. It is more preferred that the solvent further have volatility. To be specific, the solvent preferably has a boiling point of 100° C. or lower. Examples of the solvent include: water (having a boiling point of 100° C.); cyclic ethers such as oxetane (having a boiling point of 48° C.), tetrahydrofuran (having a boiling point of 66° C.), and tetrahydropyran (having a boiling point of 88° C.); and alcohols such as 1-propanol (having a boiling point of 97° C.), 2-propanol (having a boiling point of 82° C.), ethanol (having a boiling point of 78° C.), and methanol (having a boiling point of 65° C.). It should be noted that the poor solvent can be used after having been mixed with the solvent of the polymer solution such as NMP (having a boiling point of 202° C.) or N,N-dimethylformamide (having a boiling point of 153° C.).

The coating film that has been made porous is sufficiently washed with the poor solvent. After that, the solvent absorption sheet is peeled and the remainder is fixed with, for example, a pin, a chuck, pinch rolls, or a pin stenter so as not to thermally contract. The resultant is subjected to a heat treatment. Thus, a porous polymer film from which the solvent has been removed is obtained.

It should be noted that, when a raw material for the polymer solution is a polyamic acid solution as a precursor for polyimide, imide conversion must be performed by a heat dehydration reaction as required. Conditions for the heat treatment in this case are preferably as described below. That is, the heat treatment is performed at 280 to 500° C. for about 5 to 90 minutes because the imide conversion does not occur sufficiently at lower than 280° C., and the film deteriorates at higher than 500° C. In addition, imide conversion by a chemical action is also available as an alternate method.

The porous polymer film thus obtained can resist heat having a temperature of 150° C. or higher. In addition, its thickness can be 0.01 to 500 μm.

As described above, the solvent absorption sheet of the present invention is intended to control a solvent concentration in the coating film by selectively absorbing the solvent component from the inside of the coating film before a process in which the coating film is brought into contact with the poor solvent so as to precipitate. In addition, the amount of the solvent removed from above the coating film is controlled so that the final porosity of the porous polymer film may be controlled.

In each of the methods described in Japanese Patent Application Laid-Open No. 2007-169661, Japanese Patent No. 4,110,669, and Japanese Patent Application Laid-Open No. 2003-138057, the sheet with which the coating film is covered is requested to have such permeability that, when the coating film is brought into contact with the poor solvent so as to precipitate, the solvent in the coating film and the poor solvent can each pass at a proper rate. Further, the sheet does not have such property as to absorb a solvent component selectively, and merely has a function of controlling a solvent substitution rate. Therefore, an object of the covering is different from that of the present invention, and the constitution of the sheet is also different from that of the present invention.

Further, one feature of the production method according to the present invention lies in that the use of the solvent absorption sheet allows one to freely set the solute concentration of the solution used at the time of the film formation. As a result, a desired porous film (for example, a porous film having a low porosity) can be produced by using a solution having a low solute concentration which can be easily handled, i.e., a solution having a low viscosity. As a result, a porous film having a desired porosity can be easily formed by, for example, application.

Hereinafter, the present invention is specifically described by way of examples. However, the present invention is not limited to these examples. In each of the following examples, a porous polymer film was evaluated by measuring the following physical properties.

(Porosity)

The thickness and weight of a porous polymer film cut into a predetermined size were measured, and a porosity was determined from an apparent change in density by using the following equation. In the equation, S represents the area of the porous polymer film, d represents the thickness, W represents the measured weight, and D represents the density of a resin alone free of voids.

Porosity(%)=100−100×(W/D)/(S×d)

(Void Shapes and Void Distribution)

Void shapes and a void distribution in the produced porous polymer film were judged on the basis of the result of the observation of its section with an ultrahigh-resolution field emission scanning electron microscope (S-4800, manufactured by Hitachi, Ltd.).

An area ratio of independent voids to all voids per unit area of 80% or more was evaluated as o, and an area ratio of less than 80% was evaluated as x. In addition, an area ratio of voids each having a void diameter in excess of 5 μm to all voids per unit area of 5% or less was evaluated as o, and an area ratio in excess of 5% was evaluated as x. It should be noted that Table 1 shows the judgement results of examples and Table 2 shows the judgement results of comparative examples.

POROUS POLYMER FILM PRODUCTION EXAMPLES

Example 1

A coating film having a thickness of 0.3 mm was prepared by using a polyimide sheet having a thickness of 128 μm as a substrate and a polymer solution 1 (U-Varnish A, manufactured by Ube Industries, Ltd., an 18-wt % polyamic acid-NMP solution, SP value of NMP: 22.4, volume fraction of NMP: 86 vol %). The coating film was covered with a solvent absorption sheet 1 (MF-membrane, manufactured by Nihon Millipore K.K., thickness: 90 μm) formed of cellulose nitrate (SP value: 22.1) and cellulose acetate (SP value: 22.8) having an area enough to cover an entire surface on the film at room temperature, and then the solvent was absorbed and removed for 30 minutes. After that, the above-mentioned sheet in a state of being covered with the solvent absorption sheet was immersed in water so that the coating film might be made porous.

The above-mentioned sheet was taken out of water, and the solvent absorption sheet was peeled from the coating film. The coating film on the substrate which had been made porous was baked under heat in the air. Thus, a porous polymer film was produced. It should be noted that the heat baking process was performed in accordance with the following program. First, the temperature was held at 80° C. for 130 minutes. After that, the temperature was increased to 150° C. at a rate of 10° C./min, and was then held at 150° C. for 10 minutes. After that, the temperature was increased to 250° C. at a rate of 10° C./min, and was then held at 250° C. for 30 minutes. After that, the temperature was increased to 350° C. at a rate of 10° C./min.

The resultant porous polymer film had a porosity of 54%. FIG. 1 illustrates the result of the observation of the resultant porous polymer film with a scanning electron microscope (SEM).

Example 2

A porous polymer film was prepared in the same manner as in Example 1 with the exception that a solvent absorption sheet with which the coating film was covered was a solvent absorption sheet 2 (Nitrocellulose Membrane 1, manufactured by Nihon Millipore K.K., thickness: 155 μm) formed of cellulose nitrate. The resultant porous polymer film had a porosity of 31%. The kind of the solvent absorption sheet of Example 2 was substantially identical to that of Example 1, and the control of a reduction in porosity was attained by increasing the thickness of the sheet.

Example 3

A porous polymer film was prepared in the same manner as in Example 1 with the exception that a solvent absorption sheet with which the coating film was covered was a solvent absorption sheet 3 (SI-50, manufactured by Nihon Millipore K.K., thickness: 144 μm) formed of cellulose nitrate and cellulose acetate. The resultant porous polymer film had a porosity of 45%. Although, the kind of the solvent absorption sheet of Example 3 was not exactly identical to that of Example 1, the porosity was controlled to be low by increasing the thickness of the sheet.

Example 4

A porous polymer film was prepared in the same manner as in Example 1 with the exception that a solvent absorption sheet with which the coating film was covered was a solvent absorption sheet 4 (Nitrocellulose Membrane 2, manufactured by Nihon Millipore K.K., thickness: 70 μm) formed of cellulose nitrate. The resultant porous polymer film had a porosity of 58%. The porosity was controlled to be high by reducing the thickness of the sheet compared with Example 2.

Example 5

A porous polymer film was prepared in the same manner as in Example 1 with the exception that: a polymer solution for the formation of a coating film was a polymer solution 2 (RIKACOAT, manufactured by New Japan Chemical co., ltd., a 20-wt % sulfone group-containing polyimide-NMP solution, SP value of NMP: 22.4, volume fraction of NMP: 84 vol %); and the solvent absorption sheet 2 identical to that of Example 2 was used as a solvent absorption sheet with which the coating film was covered. The resultant porous polymer film had a porosity of 22%. Accordingly, it was confirmed that a compound except polyamic acid enabled the control of voids.

Example 6

A porous polymer film was prepared in the same manner as in Example 1 with the exception that: a polymer solution for the formation of a coating film was a polymer solution 3 (HIMAL HL-1200, manufactured by Hitachi Chemical co., Ltd., a 12-wt % polyamide-NMP solution, SP value of NMP: 22.4, volume fraction of NMP: 91 vol %); and the solvent absorption sheet 2 identical to that of Example 2 was used as a solvent absorption sheet with which the coating film was covered. The resultant porous polymer film had a porosity of 23%. Accordingly, it was confirmed that a compound except polyamic acid and polyimide enabled the control of voids.

Example 7

A porous polymer film was prepared in the same manner as in Example 1 with the exception that: a polymer solution for the formation of a coating film was a polymer solution 4 (HIMAL HL-1210BC, manufactured by Hitachi Chemical co., Ltd., a 15-wt % polyamideimide-diglyme solution, SP value of diglyme: 17.0, volume fraction of diglyme: 88 vol %); and the solvent absorption sheet 2 identical to that of Example 2 was used as a solvent absorption sheet with which the coating film was covered. The resultant porous polymer film had a porosity of 26%. Accordingly, it was confirmed that a compound except polyamic acid, polyimide, and polyamide enabled the control of voids.

Example 8

A porous polymer film was prepared in the same manner as in Example 2 by using the solvent absorption sheet 2 identical to that of Example 2 with the exception that the two solvent absorption sheets 2 were simultaneously laminated. The resultant porous polymer film had a porosity of 19%. Comparison with Examples 2 and 4 confirmed that the preparation of a porous polymer film having an additionally low porosity was attained by increasing the thickness of a solvent absorption sheet.

Example 9

A porous polymer film was prepared in the same manner as in Example 2 by using the solvent absorption sheet 2 identical to that of Example 2 with the exception that the three solvent absorption sheets 2 were simultaneously laminated. The resultant porous polymer film had a porosity of 12%. Comparison with Examples 2, 4, and 8 confirmed that the preparation of a porous polymer film having an additionally low porosity was attained by increasing the thickness of a solvent absorption sheet.

Example 10

A porous polymer film was prepared in the same manner as in Example 2 with the exception that a solvent absorption sheet with which the coating film was covered was one solvent absorption sheet 3 (Nitrocellulose 1, thickness: 60 μm). The resultant porous polymer film had a porosity of 45%. Comparison with Example 2 confirmed that the preparation of a porous polymer film having an additionally high porosity was attained by shortening the time period for which the coating film was covered with the solvent absorption sheet.

Example 11

A porous polymer film was prepared in the same manner as in Example 2 with the exception that the coating film was covered with the solvent absorption sheet 2 identical to that of Example 2 in a state where the coating film was heated to 45° C. The resultant porous polymer film had a porosity of 22%. Comparison with Example 2 confirmed that the preparation of a porous polymer film having an additionally low porosity was attained by increasing the temperature upon covering with the solvent absorption sheet.

Example 12

A porous polymer film was prepared in the same manner as in Example 2 with the exception that the coating film was covered with the solvent absorption sheet 2 identical to that of Example 2 in a state where the coating film was cooled to 0° C. The resultant porous polymer film had a porosity of 40%. Comparison with Example 2 confirmed that the preparation of a porous polymer film having an additionally high porosity was attained by decreasing the temperature upon covering with the solvent absorption sheet.

Example 13

A porous polymer film was prepared in the same manner as in Example 2 with the exception that the thickness of the coating film was set to 0.1 mm. The resultant porous polymer film had a porosity of 9%. Comparison with Example 2 confirmed that the preparation of a porous polymer film having an additionally low porosity was attained by reducing the thickness of the coating film upon covering with the solvent absorption sheet.

Example 14

A porous polymer film was prepared in the same manner as in Example 2 with the exception that the thickness of the coating film was set to 0.5 mm. The resultant porous polymer film had a porosity of 45%. Comparison with Example 2 confirmed that the preparation of a porous polymer film having an additionally high porosity was attained by increasing the thickness of the coating film upon covering with the solvent absorption sheet.

TABLE 1

| Example | Constituent resin | Resin concentration (wt %) | Volume fraction of solvent (%) | Coating film thickness (mm) | Solvent absorption sheet Thickness (μm) | Covering time (minutes) | Covering temperature | Porosity (%) | Void shapes | Void distribution |
|---|---|---|---|---|---|---|---|---|---|---|
| 1 | Polyamic acid | 18 | 86 | 0.3 | MF-membrane 90 | 30 | Room temperature | 54 | ○ | ○ |
| 2 | Polyamic acid | 18 | 86 | 0.3 | Nitrocellulose Membrane 1 155 | 30 | Room temperature | 31 | ○ | ○ |
| 3 | Polyamic acid | 18 | 86 | 0.3 | SI-50 144 | 30 | Room temperature | 45 | ○ | ○ |
| 4 | Polyamic acid | 18 | 86 | 0.3 | Nitrocellulose Membrane 2 70 | 30 | Room temperature | 58 | ○ | ○ |
| 5 | Sulfone group-containing polyimide | 20 | 86 | 0.3 | Nitrocellulose Membrane 1 155 | 30 | Room temperature | 22 | ○ | ○ |
| 6 | Polyamide | 12 | 91 | 0.3 | Nitrocellulose Membrane 1 155 | 30 | Room temperature | 23 | ○ | ○ |
| 7 | Polyamideimide | 15 | 88 | 0.3 | Nitrocellulose Membrane 1 155 | 30 | Room temperature | 26 | ○ | ○ |
| 8 | Polyamic acid | 18 | 86 | 0.3 | Nitrocellulose Membrane 1 155 (Two sheets) | 30 | Room temperature | 19 | ○ | ○ |
| 9 | Polyamic acid | 18 | 86 | 0.3 | Nitrocellulose Membrane 1 155 (Three sheets) | 30 | Room temperature | 12 | ○ | ○ |
| 10 | Polyamic acid | 18 | 86 | 0.3 | Nitrocellulose Membrane 1 60 | 10 | Room temperature | 45 | ○ | ○ |
| 11 | Polyamic acid | 18 | 86 | 0.3 | Nitrocellulose Membrane 1 155 | 30 | 45° C. | 22 | ○ | ○ |
| 12 | Polyamic acid | 18 | 86 | 0.3 | Nitrocellulose Membrane 1 155 | 30 | 0° C. | 40 | ○ | ○ |
| 13 | Polyamic acid | 18 | 86 | 0.1 | Nitrocellulose Membrane 1 155 | 30 | Room temperature | 9 | ○ | ○ |
| 14 | Polyamic acid | 18 | 86 | 0.5 | Nitrocellulose Membrane 1 155 | 30 | Room temperature | 45 | ○ | ○ |

In each example, with regard to the "void shapes", an area ratio of independent voids to all voids per unit area at the time of the observation of a section of 80% or more was evaluated as ○, and an area ratio of less than 80% was evaluated as x, and with regard to the "void distribution", an area ratio of voids each having a void diameter in excess of 5 μm to all voids per unit area at the time of the observation of a section of 5% or less was evaluated as ○, and an area ratio in excess of 5% was evaluated as x.

Comparative Example 1

Figure 2:
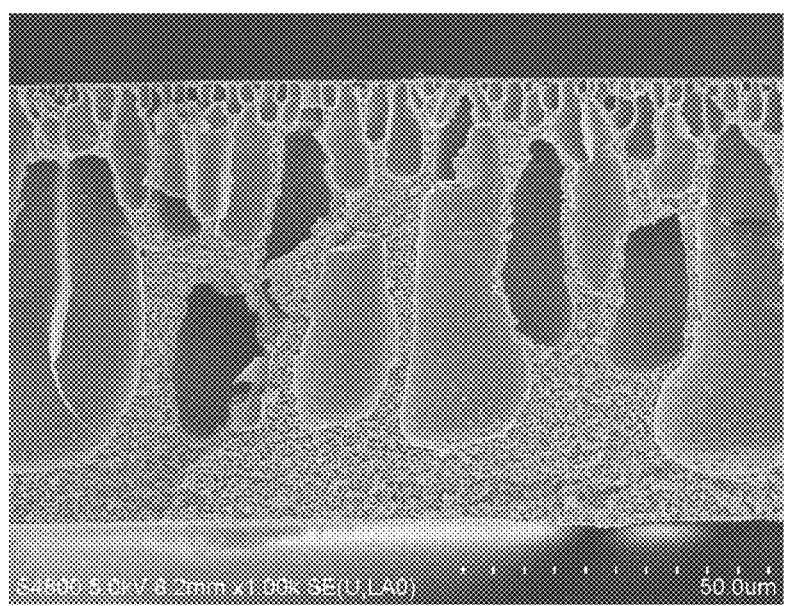
FIG. 2 is a scanning electron microscope photograph of the section of a porous polyimide film prepared in Comparative Example 1.

A porous polymer film was prepared under the same conditions as those of Example 1 with the exception that the coating film was made porous by being immersed in water in a state where the film was covered with nothing. The resultant porous polymer film had a porosity of 72%. FIG. 2 illustrates the result of the observation of the resultant porous polymer film with an SEM. Void shapes were nonuniform, and a large void having a diameter in excess of 10 μm was present. Accordingly, moderate bending of the film easily resulted in cracking.

Comparison with Examples 1, 2, 3, 4, 8, 9, 10, 11, 12, and 13 confirmed that a high porosity was obtained when the coating film was not covered with any solvent absorption sheet.

Comparative Example 2

A porous polymer film was prepared under the same conditions as those of Example 1 with the exception that a sheet with which the coating film was covered was a cellulose sheet (manufactured by Nihon Millipore K.K., thickness: 170 μm, SP value: 31.4). The cellulose sheet could not selectively absorb the solvent of the polymer solution 1, and absorbed the entirety of the solution to swell. In addition, the sheet was dilapidated by being immersed in water. Accordingly, the sheet could not be peeled. In addition, the sheet dug into the porous polymer film after its drying, and hence could not be separated. As a result, a porous polymer film could not be obtained.

Comparison with Examples 1, 2, 3, 4, 8, 9, 10, 11, 12, and 13 confirmed that a porous polymer film could not be prepared by covering the coating film with a sheet having an SP value largely different from that of the coating film.

Comparative Example 3

A porous polymer film was prepared under the same conditions as those of Example 1 with the exception that a sheet with which the coating film was covered was an aluminum sheet (manufactured by SUMIKEI ALUMINUM FOIL Co., Ltd., thickness: 7 μm). However, after immersion in water, the coating film showed no change and retained its fluidity, and hence a porous polymer film could not be obtained.

Comparison with Examples 1, 2, 3, 4, 8, 9, 10, 11, 12, and 13 confirmed that a porous polymer film could not be prepared by covering the coating film with a sheet poor in solvent-absorbing characteristic.

Comparative Example 4

A porous polymer film was prepared under the same conditions as those of Example 1 with the exception that a sheet with which the coating film was covered was a Saran resin sheet (manufactured by Asahi Kasei Home Products Corporation, thickness: 11 μm, SP value: 19.6). However, after immersion in water, the coating film showed no change and retained its fluidity, and hence a porous polymer film could not be obtained.

Comparison with Examples 1, 2, 3, 4, 8, 9, 10, 11, 12, and 13 confirmed that a porous polymer film could not be prepared by covering the coating film with a sheet poor in solvent-absorbing characteristic.

Comparative Example 5

A porous polymer film was prepared under the same conditions as those of Comparative Example 1 with the exception that a polymer solution for the preparation of a coating film was the polymer solution 2 (RIKACOAT, manufactured by New Japan Chemical co., ltd., a 20-wt % sulfone group-containing polyimide-NMP solution, SP value of NMP: 22.4, volume fraction of NMP: 84 vol %). The resultant porous polymer film had a porosity of 72%.

Comparison with Example 5 confirmed that a high porosity was obtained when the coating film was not covered with any solvent absorption sheet.

Comparative Example 6

A porous polymer film was prepared under the same conditions as those of Comparative Example 1 with the exception that a polymer solution for the preparation of a coating film was the polymer solution 3 (HIMAL HL-1200, manufactured by Hitachi Chemical co., Ltd., a 12-wt % polyamide-NMP solution, SP value of NMP: 22.4, volume fraction of NMP: 91 vol %). The resultant porous polymer film had a porosity of 68%. Comparison with Example 6 confirmed that a high porosity was obtained when the coating film was not covered with any solvent absorption sheet.

Comparative Example 7

A porous polymer film was prepared under the same conditions as those of Comparative Example 1 with the exception that a polymer solution for the preparation of a coating film was the polymer solution 4 (HIMAL HL-1210BC, manufactured by Hitachi Chemical co., Ltd., a 15-wt % polyamide-imide-diglyme solution, SP value of diglyme: 17.0, volume fraction of diglyme: 88 vol %). The resultant porous polymer film had a porosity of 71%. Comparison with Example 7 confirmed that a high porosity was obtained when the coating film was not covered with any solvent absorption sheet.

Comparative Example 8

Porous polymer films were prepared under the same conditions as those of Comparative Examples 1 and 5 to 7 with the exception that a sheet with which the coating film was covered was a porous film (UPORE 3093, manufactured by Ube Industries, Ltd., thickness: 15 μm) formed of a polyethylene-polypropylene copolymer (SP value: 7.9). It should be noted that the sheet has no such property as to absorb the solvent of each polymer solution selectively. The resultant porous films had porosities of 69%, 61%, 75%, and 72%. Comparison with Examples 1 and 5 to 7 confirmed that a high porosity was obtained when the coating film was not covered with any solvent absorption sheet.

TABLE 2

| Comparative Example | Constituent resin | Resin concentration (wt %) | Volume fraction of solvent (%) | Coating film thickness (mm) | Sheet Thickness (μm) | Covering time (minutes) | Covering temperature | Porosity (%) | Void shapes | Void distribution |
|---|---|---|---|---|---|---|---|---|---|---|
| 1 | Polyamic acid | 18 | 86 | 0.3 | None | 30 | Room temperature | 72 | x | x |
| 2 | Polyamic acid | 18 | 86 | 0.3 | Cellulose sheet 170 | 30 | Room temperature | No film formation | x | x |
| 3 | Polyamic acid | 18 | 86 | 0.3 | Aluminum foil 10 | 30 | Room temperature | No film formation | x | x |
| 4 | Polyamic acid | 18 | 86 | 0.3 | Saran resin sheet 11 | 30 | Room temperature | No film formation | x | x |
| 5 | Sulfone group-containing polyimide | 20 | 84 | 0.3 | None | 30 | Room temperature | 72 | x | x |
| 6 | Polyamide | 12 | 91 | 0.3 | None | 30 | Room temperature | 68 | x | x |
| 7 | Polyamideimide | 15 | 88 | 0.3 | None | 30 | Room temperature | 71 | x | x |
| 8 | Polyamic acid | 18 | 86 | 0.3 | UPORE U3093 | 30 | Room temperature | 69 | o | o |
|  | Sulfone group-containing polyimide | 20 | 84 | 0.3 | UPORE U3093 | 30 | Room temperature | 61 | o | o |
|  | Polyamide | 12 | 91 | 0.3 | UPORE U3093 | 30 | Room temperature | 75 | o | o |
|  | Polyamideimide | 15 | 88 | 0.3 | UPORE U3093 | 30 | Room temperature | 72 | o | o |

In each comparative example, with regard to the "void shapes", an area ratio of independent voids to all voids per unit area at the time of the observation of a section of 80% or more was evaluated as o, and an area ratio of less than 80% was evaluated as x, and with regard to the "void distribution", an area ratio of voids each having a void diameter in excess of 5 μm to all voids per unit area at the time of the observation of a section of 5% or less was evaluated as o, and an area ratio in excess of 5% was evaluated as x.

The porous polymer film obtained in the present invention can be utilized in, for example, a lightweight structural material, a separation film, a cell member, a medical material, a soundproof material, a damping material, a heat insulator, or a cushioning material. In particular, the film is applicable as a fixing member in a copying machine, printer, or the like utilizing an electrophotographic system.

The present invention is not limited to the above embodiments and various changes and modifications can be made within the spirit and scope of the present invention. Therefore to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149220, filed Jun. 23, 2009, which is hereby incorporated by reference herein in its entirety.

The invention claimed is:

1. A method of producing a porous polymer film, the method comprising:

forming a film of a solution containing a polymer constituting a porous polymer film;

bringing a sheet that selectively absorbs a solvent in the solution rather than a solute in the solution into contact with the film; and making the film porous after the contact with the sheet.

2. The method of producing a porous polymer film according to claim 1, wherein the porous polymer film is constituted of an engineering plastic.

3. The method of producing a porous polymer film according to claim 1, wherein the solvent of the solution containing the polymer is constituted of at least one kind of N,N-dimethylformamide, N,N-dimethylacetamide, N,N-diethylformamide, N,N-diethylacetamide, N,N-dimethylmethoxyacetamide, 1-methyl-2-pyrrolidone, dimethyl sulfoxide, pyridine, tetramethylene sulfone, dimethyltetramethylene sulfone, diglyme, nitrobenzene, and carbon disulfide, and a total volume fraction of the solvent is 50% or more with respect to an entirety of the solution containing the polymer.

4. The method of producing a porous polymer film according to claim 1, wherein the sheet with which the film is contacted is constituted of at least one kind of cellulose-, nylon-, and polyester-based materials.

5. The method of producing a porous polymer film according to claim 1, wherein the sheet is contacted with the film in a gas phase for a time period from 1 to 60 minutes.

* * * * *